T. G. AMES.
Apparatus for Preserving Meat, &c.
No. 199,248. Patented Jan. 15, 1878.
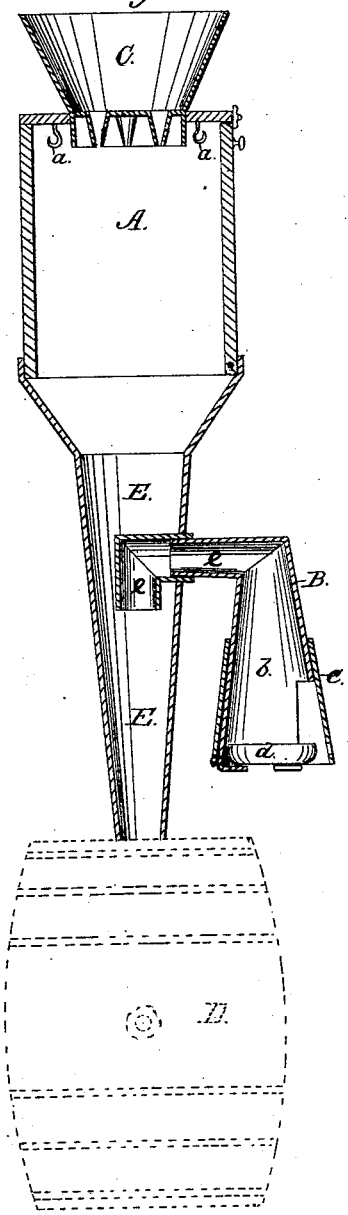
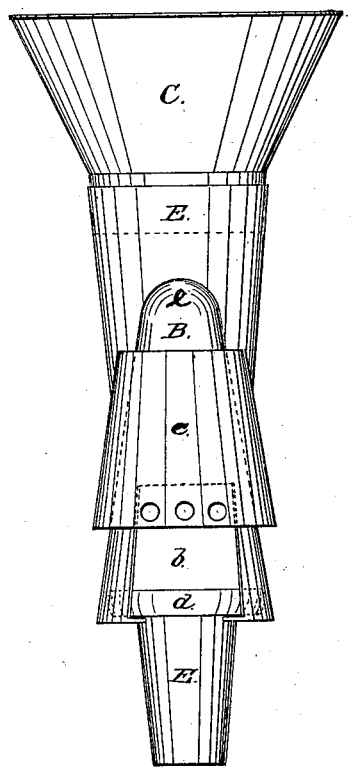
WITNESSES:
W. W. Hollingsworth
Solon C. Kemon
INVENTOR:
Theodore G. Ames
BY
[signature]
ATTORNEYS.

UNITED STATES PATENT OFFICE.

THEODORE G. AMES, OF DENTON, TEXAS.

IMPROVEMENT IN APPARATUS FOR PRESERVING MEAT, &c.

Specification forming part of Letters Patent No. 199,248, dated January 15, 1878; application filed August 14, 1877.

*To all whom it may concern:*

Be it known that I, THEODORE G. AMES, of the city and county of Denton, and State of Texas, have invented a new and Improved Apparatus for Preserving Meat and other articles of food; and I do hereby declare that the following is a full, clear, and exact description of the same.

The invention relates to an improved apparatus for use in fumigating substances used as food; and also for impregnating water with sulphurous-acid gas, for the purpose of preserving such substances by the antiseptic quality of sulphur.

In the accompanying drawings, forming part of this specification, Figure 1 is a sectional elevation of the apparatus, and Fig. 2 an elevation of a modified arrangement.

The fumigating apparatus proper consists of a box or case, A, and a furnace attachment, B, for burning sulphur. The box A has a removable side, to adapt it for insertion and removal of meat, &c., which is suspended from hooks a. A funnel, C, is placed in the top of the box, through which water may be introduced for the purpose of spraying or sprinkling the chamber, and thereby causing the sulphurous-acid fumes arising from combustion of sulphur in the furnace attachment B to enter and disseminate themselves in the chamber. The funnel, likewise, serves as a convenient means for introducing water into the barrel or other cask D, the box A having a detachable tapered or funnel-shaped tube, E, which enters an aperture in the cask, and supports the box and furnace attachment B, as shown in Fig. 1.

The furnace consists of an inverted funnel-shaped tube, b, which is open at the bottom and cut away on one side. The side opening may be wholly or partly closed by an annular slide or damper, c, having air-apertures in one side. The pan d for holding the sulphur is supported within the funnel b by means of lugs or flanges attached to the latter. The tube e, forming the upward continuation of funnel b, enters the tube E, and is bent downward within the latter, for the purpose of preventing water entering the tube e.

The operation is as follows: The meat to be fumigated having been suspended in the chamber A, and water introduced therein and also into the cask D, sulphur is placed in the pan d and ignited. The sulphurous gas evolved by the combustion, owing to its great affinity for water, fills the dampened chamber A, but the bulk of it descends into the cask. The meat is thereby fumigated, and the water in the cask thoroughly impregnated. The meat is next removed from the chamber A, and, if required to be preserved for a long time, is dipped or left immersed in the water in cask D, which has both the taste and smell of the gas, and hence partakes of its antiseptic quality.

I show in Fig. 2 a modification of the apparatus, the box A being dispensed with, and the funnel C inserted directly in the mouth of tube E. This form of the apparatus is used for impregnating the water as it goes into the cask, for the purpose of treating vegetables alone. The manner of treating vegetables is this: The vegetables or fruits are to be put into any cask, jar, or vessel, in which they are to be kept, and this jar, vessel, or cask is to be filled with the water impregnated by the aforesaid apparatus.

What I claim is—

1. The combination, with the fumigating-box A, its connected funnel C and tube E, of the furnace attachment B, having its flue e projecting into the tube E and bent downward therein, substantially as shown and described.

2. The combination of the furnace attachment with the tube E, tapered from its upper to its lower extremity, to adapt it for insertion in an aperture in a cask, and to render it self-supporting therein, as shown and described.

THEODORE GEORGE AMES.

Witnesses:
J. D. FERGUSON,
JNO. L. LOVEJOY, Jr.